United States Patent Office 3,186,990
Patented June 1, 1965

3,186,990
2-THIENYLMETHYLMERCAPTOAMIDINE HYDROCHLORIDES AND CYCLIC DERIVATIVES THEREOF
William H. Hensley, Raleigh, N.C., and Joseph A. Lambrech, deceased, late of Charleston, W. Va., by Valiah G. Lambrech, executrix, Charleston, W. Va., assignors to Union Carbide Corporation, New York, N.Y., a corporation of New York
No Drawing. Filed Aug. 22, 1961, Ser. No. 133,271
8 Claims. (Cl. 260—251)

This invention relates to 2-thienylmethylmercaptoamidine hydrochlorides and cyclic derivatives thereof. More particularly, the present invention relates to 2-thienylmethylmercaptoamidine hydrochlorides and cyclic derivatives thereof, to a process for their preparation, and to their use as fungicides.

The compounds of the present invention may be represented by the formula:

$$R^1-C\underset{S}{\overset{\phantom{X}}{\diagdown}}C-R^2$$
$$R-C\phantom{XX}C-CH_2-S-R^3$$

wherein R, when taken alone is a hydrogen atom or a $-CH_2SZ$ radical; $R^1$, when taken alone, is a hydrogen atom; R and $R^1$, when taken together form a divalent $-CH=CH-CH=CH-$ radical; $R^2$ is a hydrogen atom or a $-CH_2SZ$ radical; only one of said R and $R^2$ being a $-CH_2SZ$ radical; $R^3$, when R is a hydrogen atom, is a $$-C\underset{\underset{H}{N}}{\overset{N}{\diagup}}(CH_2)_n \cdot HCl$$

radical, wherein n is an integer having a value of 2 or 3 and, when R is a $-CH_2SZ$ radical, is a Z radical; and Z is a $$-C\underset{NH_2}{\overset{NH}{\diagup}}\cdot HCl, \quad -C\underset{\underset{H}{N}-CH_2}{\overset{N-CH_2}{\diagup}}\cdot HCl, \quad \text{or} \quad -C\underset{\underset{H}{N}-CH_2}{\overset{N-CH_2}{\diagup}}CH_2 \cdot HCl$$

radical.

Thus, the compounds of this invention can be monosubstituted thiophenes represented by the formula:

$$\underset{S}{\overset{HC----CH}{\underset{HC\phantom{X}C-CH_2-S-C}{\diagdown\diagup}}}\overset{N}{\underset{\underset{H}{N}}{\diagup}}(CH_2)_n \cdot HCl$$

a disubstituted thiophene represented by the formula:

$$ZSCH_2-C\underset{S}{\overset{HC----CH}{\diagdown\diagup}}C-CH_2SZ$$

or a substituted thianaphthene represented by the formula (structure)

wherein n, $R^2$, and Z are as previously defined.

Illustrative of the compounds of this invention one can mention:

Compound No. 1: 2-(2-thienylmethylmercapto)imidazoline hydrochloride (structure) ·HCl Compound No. 2: 2-(2-thianaphthenylmethylmercapto)-imidazoline hydrochloride (structure) ·HCl Compound No. 3: 2,3-bis(isothiuroniummethyl)thianaphthene dihydrochloride (structure) ·HCl Compound No. 4: 2,3 - bis(2 - imidazolinylmercaptomethyl)thianaphthene dihydrochloride (structure) ·HCl ·HCl Compound No. 5: 2,5 - bis(isothiuroniummethyl)thiophene dihydrochloride (structure) ·HCl Compound No. 6: 2.5 - bis(2 - imidazolinylmercaptomethyl)thiophene dihydrochloride (structure) ·HCl Compound No. 7: 2-(2-thienylmethylmercapto)-3,4,5,6-tetrahydropyrimidine hydrochloride (structure) ·HCl The compounds of the present invention are produced, generally, in two steps. The first step comprises reacting formaldehyde with thiophene or thianaphthene in the presence of hydrogen chloride to form a mono- or a dichloromethyl intermediate. The second step comprises reacting the monochloromethyl or dichloromethyl intermediate produced in the first step with thiourea, ethylene thiourea, or trimethylenethiourea to form the final product.

The following typical reactions, illustrating the production of 2-(2-thienylmethylmercapto)imidazoline hydrochloride (Compound No. 1), are representative of the overall process involved in the present invention:

Step 1:

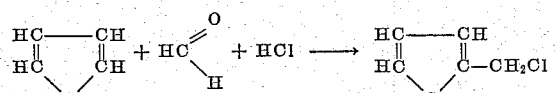

Step 2:

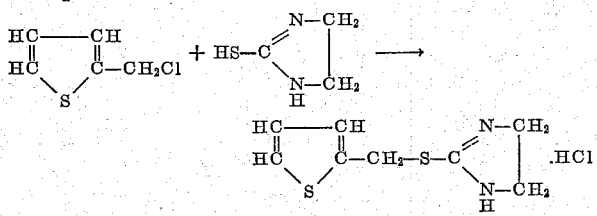

The above reactions illustrate the formation of the monochloromethyl intermediate (Step 1) employing thiophene, formaldehyde, and hydrogen chloride and the reaction of the monochloromethyl intermediate (in this case, 2-chloromethylthiophene) with ethylene thiourea (Step 2) to form the desired product (in this case, 2-(2-thienyl-methylmercapto)-imidazoline hydrochloride).

The first step of the process can be conducted at a temperature of from about −10° C. to about 60° C. To produce the monochloromethylthiophene, about equimolar quantities of thiophene and formaldehyde (preferably in aqueous solution) and an excess (preferably 100 percent excess or more) of hydrogen chloride are employed. However, under the same temperature conditions, the molar ratio of the reactants can be changed to 1 mole of thiophene, 2 moles of hydrogen chloride, and about 3 moles or more (representing a 50 percent excess) of formaldehyde to produce the 2,5-bis(chloromethyl)thiophene.

In the first step of the process, under the same conditions as described above, thianaphthene can be employed in the place of thiophene. Under these circumstances the monochloromethyl compound produced is 2-chloromethylthianaphthene and the dichloromethyl compound produced is 2,3-bis(chloromethyl)thianaphthene.

The product of the first step of the process can be recovered by conventional means, for example, by extraction with a suitable solvent such as ethyl ether to extract the product and evaporating the solvent to leave the desired product.

The second step of the process can be conducted at a temperature of from about 25° C. to about 100° C. and is preferably conducted in the presence of an organic solvent such as ethanol. Other solvents which may be employed include: other alcohols such as isopropanol, ketones such as acetone, and hydrocarbons such as benzene and heptane. When a monochloromethyl compound is employed in the second step, about an equimolar amount of ethylene thiourea is used; whereas, when a bis(chloromethyl) compound is employed, about 2 molar proportions of ethylene thiourea are employed.

Thiourea or trimethylene thiourea can be substituted for ethylene thiourea in the second step of the process, which is conducted under the same conditions using these materials as are employed when ethylene thiourea is used.

The product can be recovered by conventional means, for example, by diluting the reaction mixture with ethyl ether and filtering to recover the product as a precipitate.

The following examples are illustrative.

The ethylene thiourea employed in the examples can be produced as follows:

One mole (60 grams) of ethylenediamine and 300 ml. of water were charged to a 4-neck one-liter flask equipped with a stirrer, thermometer, condenser, and cooling bath. To this flask and contents, which were maintained at a temperature of 25 to 30° C., 78 grams (1 mole plus 2 grams excess) of carbon disulfide was added, whereupon the flask and contents were heated to the refluxing temperature (100° C.). The heating at reflux was continued for about seven hours by which time the evolution of hydrogen sulfide had ceased and then cooled to 10° C. The product was recovered by filtration and washed thoroughly with water and dried at room temperature. About 79 grams of ethylene thiourea, a white crystalline solid having a melting point of 198 to 200° C., was obtained in an 88 percent yield.

The trimethylene thiourea employed in the examples can be produced as follows:

To a mixture of 296 grams of 1,3-propylenediamine and 1200 cc. of water, 306 grams of carbon disulfide was slowly added at 30° C. After the addition of carbon disulfide, the reaction mixture was slowly heated to the reflux point. Heating was continued until no further hydrogen sulfide was evolved. The reaction mixture was cooled to 15° C. Trimethylene thiourea separated as a solid and was filtered and washed with water.

EXAMPLE I.—PRODUCTION OF 2-CHLORO-METHYLTHIOPHENE

A reactor was charged with 87.5 cc. of concentrated hydrochloric acid and 75 cc. of 40 percent aqueous formaldehyde and hydrogen chloride gas was then fed into the resulting reaction mixture, while cooling it to 0° C. Thiophene (77 cc.) was then added to the mixture at 0° C.–10° C. with stirring and with the hydrogen chloride gas still passing through the mixture. After the addition of the thiophene was completed, the hydrogen chloride gas was passed through the reaction mixture until the mixture was saturated. The mixture was then stirred for one hour, during which time the temperature increased to 40° C. The mixture was then cooled to 0° C.–10° C. and 350 cc. of water was added. The oil which separated from the mixture was removed by extraction with ethyl ether. The ether extraction was then dried over anhydrous potassium carbonate and evaporated to dryness on a steam jet to leave 97 grams of 2-chloromethylthiophene.

EXAMPLE II.—PRODUCTION OF 2-CHLORO-METHYLTHIANAPHTHENE

To a mixture of 84 grams 36 percent formaldehyde, 100 grams 36 percent hydrochloric acid, and 200 cc. of ethanol, 134 grams of thianaphthene was slowly added at 0° C. During the addition of the thianaphthene, a small stream of hydrogen chloride gas was passed through the mixture. The reaction was continued with good agitation and heat was removed by cooling. After the addition of the thianaphthene, the reaction was allowed to warm up to 10° C. and held at this temperature for sixteen hours. The reaction mixture was then extracted with ethyl ether. The ether extraction was dried with sodium sulfide and filtered. The ethyl ether was removed by distillation and the residue was 2-chloromethylthianaphthene.

EXAMPLE III.—PRODUCTION OF 2,3-BIS(CHLOROMETHYL)THIANAPHTHENE

To a mixture of 30 grams of paraformaldehyde and 125 grams of acetic acid, 33 grams of thianaphthene was slowly added at a temperature of 35° C. During the addition of the thianaphthene, a stream of hydrogen chloride gas was passed through the reaction mixture. The temperature was allowed to increase to 58° C. After the thianaphthene was added the reaction mixture was held at room temperature for sixteen hours. It was then cooled to 15° C. and filtered. The solid, which is 2,3-bis(chloromethyl)thianaphthene, was washed with petroleum ether and dried.

EXAMPLE IV.—PRODUCTION OF 2-(2-THIENYL-METHYLMERCAPTO)IMIDAZOLINE HYDROCHLORIDE

Sixty-six grams of ethylene thiourea and 225 cc. of absolute ethanol were heated to reflux, at which point 85 grams of 2-chloromethylthiophene was added with stirring. After all of the 2-chloromethylthiophene had been added, the reaction was maintained under reflux conditions for eight hours. Isopropanol was then added to the reaction mixture (in an equal amount by volume) and the mixture was stirred for one hour and filtered. The resulting precipitate was washed with isopropanol and air dried. The precipitate 2-(2-thienylmethylmercapto)imidazoline hydrochloride, was a brown solid which was soluble in water, and had a melting point of 105 to 110° C. and a nitrogen analysis of 11.90 (theory 11.94).

EXAMPLE V.—PRODUCTION OF 2-(2-THIANAPHTHENYLMETHYLMERCAPTO) IMIDAZOLINE HYDROCHLORIDE

Fifty-eight grams of ethylene thiourea and 225 cc. of absolute ethanol were heated to reflux. At this point, 103 grams of 2-chloromethylthiophene was fed to the reaction mixture with stirring. The mixture was maintained at this temperature for ten hours. The mixture was then cooled to room temperature and filtered and the precipitate was washed with ethyl ether and air dried. The product, 2-(2-thianaphthenylmethylmercapto)imidazoline hydrochloride, was a white crystalline solid, soluble in water, and had a melting point of 189° C.

EXAMPLE VI.—PRODUCTION OF 2,3-BIS(ISOTHIURONIUMMETHYL)THIANAPHTHENE DIHYDROCHLORIDE 2,3 - bis(isothiuroniummethyl)thianaphthene dihydrochloride was produced by adding 38 grams of thiourea to a hot (70° C.) solution of 58 grams of bis(chloromethyl)thianaphthene in 300 cc. of ethanol. The temperature of the mixture was raised to 80° C. and maintained at that point, with stirring, for a period of three hours. The reaction mixture was then cooled to 25° C. and the solid product was isolated by diluting the reaction mixture with an equal amount of ethyl ether, filtering, washing the precipitate with ethyl ether, and air drying the washed precipitate. The product, 2,3-bis(isothiuroniummethyl)thianaphthene dihydrochloride, was a pale yellow powder, soluble in water, having a melting point of 208° C. and analyzing 13.74 percent nitrogen (theory 14.61 percent).

EXAMPLE VII.—PRODUCTION OF 2,3-BIS(2-IMIDAZOLINYLMERCAPTOMETHYL) THIANAPHTHENE DIHYDROCHLORIDE 2,3 - bis(2 - imidazolinylmercaptomethyl)thianaphthene dihydrochloride was produced by adding 51 grams of ethylene thiourea to a hot (70° C.) solution of 58 grams of bis(chloromethyl)thianaphthene in 300 cc. of ethanol. The reaction mixture was heated to a temperature of 80° C. and maintained at that temperature, with stirring, for a period of three hours. The mixture was then cooled to 25° C. and the solid product was isolated by diluting the reaction mixture with an equal volume of ethyl ether, filtering, washing the precipitate with ethyl ether and air drying the washed precipitate. The product, 2,3-bis(2-imidazolinylmercaptomethyl)thianaphthene dihydrochloride, was a pale yellow powder, soluble in the water, and having a melting point of 181° C. The material analyzed 12.45 percent nitrogen (theory 12.75 percent).

EXAMPLE VIII.—PRODUCTION OF 2,5-BIS(ISOTHIURONIUMMETHYL)THIOPHENE DIHYDROCHLORIDE 2,5-bis(isothiuroniummethyl)thiophene dihydrochloride was produced by adding 38 grams of thiourea to a hot (70° C.) solution containing 45 grams of alpha,alpha'-bis(chloromethyl)thiophene and 300 cc. of ethanol. The temperature of the mixture was raised to 80° C. and was maintained at that level, with stirring, for a period of three hours. The mixture was then cooled to 25° C., stirred at that temperature for ten minutes, and then cooled to 10° C. The solid product was isolated by filtration, was washed with about 500 cc. of cold (0° C.) ethanol, and was air dried. The product was a brown powder, soluble in water, and had a melting point of 200° C. with decomposition. The product analyzed 16.34 percent nitrogen (theory 16.82 percent).

EXAMPLE IX.—PRODUCTION OF 2,5-BIS(2-IMIDAZOLINYLMERCAPTOMETHYL) THIOPHENE DIHYDROCHLORIDE 2,5 - bis(2 - imidazolinylmercaptomethyl)thiophene dihydrochloride was produced by adding 51 grams of ethylene thiourea to a hot (70° C.) solution containing 45 grams of alpha,alpha'-bis(chloromethyl)thiophene and 300 cc. of ethanol. The solution was heated to a temperature of 80° C. and maintained at that level, with stirring, for a period of three hours. The mixture was then cooled to 25° C. and the solid product was isolated by diluting the mixture with an equal amount of ethyl ether, filtering, washing the precipitate with ethyl ether, and air drying the washed precipitate. The product, 2,5-bis(2 - imidazolinylmercaptomethyl)thiophene dihydrochloride, was a brown powder which was soluble in water and had a melting point of 141° C.

EXAMPLE X.—PRODUCTION OF 2-(2-THIENYLMETHYLMERCAPTO) - 3,4,5,6 - TETRAHYDROPYRIMIDINE HYDROCHLORIDE

Twenty-five grams of trimethylene thiourea in 100 cc. of methanol was heated to reflux. At this point 27 grams of 2-chloromethylthiophene was added for a ten minute period, with stirring. The resulting mixture was maintained at reflux conditions for a period of one-half hour after the feeding of the 2-chloromethylthiophene had been completed. The mixture was then cooled to 0° C., poured slowly into 250 cc. of ethyl ether, with stirring, and allowed to stand for fifteen minutes. The mixture was then filtered and then precipitate washed with ethyl ether and air dried. The product recovered, 2-(2-thienylmethylmercapto)-3,4,5,6-tetrahydropyrimidine hydrochloride, was a white crystalline solid, which was soluble in water, and had a melting point of 152° C.

The compounds of the present invention are useful as fungicides. They are particularly useful for the control of the mildew and blight diseases affecting fruit and vegetables, providing excellent control without harming the crop or the blossoms or the foliage.

To facilitate the distribution of the fungicidal compounds disclosed herein, they are preferably applied in conjunction with a diluent or extender. The extender may be either a liquid (usually, and preferably, water) or a powdered solid. For application as dust compositions the compounds may be so admixed with finely divided solid inert materials as to provide homogeneous free-flowing dusts. The usual pulverized inert materials may be used, preferably talcs, natural clays, pyrophyllite, diatomaceous earth or cotton seed flour, or other flours. Other inert solid carriers may be magnesium or calcium carbonates, calcium phosphate, sulfur, etc., either in powder or granular form. The percent by weight of the essential active ingredient will vary according to the manner in which the composition is to be applied but, in general, will be from about 0.5 to 95 percent by weight of the dust. The inert carriers may be substituted in whole or in part by other materials which it is desired to apply to the soil, for instance fertilizers, soil conditioners, etc.

Liquid fungicidal compositions are preferably applied with water as the extender, the amount of water depending principally upon the convenience of the agriculturist and the type of spraying apparatus which he customarily uses. The sprays may contain as little as one-half pound of active fungicidal compound in 100 or more gallons of water; where the spray is to be applied with a misting machine, the aqueous suspension may contain as much as two or more pounds of active fungicidal composition in about 10 gallons of water.

In the case of aqueous sprays it is desired to have the fungicidal compound in homogeneous dispersion, and for this purpose a surface-active agent is preferably used. Substantially any wetting, dispersing, or penetrating agent may be used whether ionic, cationic, or nonionic. The preferred concentrates contain the fungicidal compound with from about 0.1 percent to 15 percent by weight of surface-active agent with a sufficient amount of the fungicidal compound to make 100 parts by weight, such compositions then being suitable for admixture with either a solid or a fluid extender. For general use, the weight of surface-active agent will be from about 5 percent to 10 percent of the weight of the active ingredient in the concentrate. Suitable surface-active, wetting or dispersing agents may be, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene carbon monoxide polymers, laurylamine hydrochloride, laurylpyridinium bromide, stearyltrimethylammonium bromide, cetyldimethylbenzyl ammonium chloride, lauryldimethylamine oxide, and the like.

The compounds contemplated herein may be used with or without "addends," for instance insecticides, such as rotenone, DDT, or nicotine sulfate, or those addends which cause the fungicides to adhere evenly and strongly to plant foliage, such as methyl cellulose, extending materials or diluents, such as the inert materials previously mentioned which facilitate the measuring of and the application of the small amounts of active materials which are desirable to inhibit the fungi. Addends such as bentonite are combined extenders and adhesives.

From a practical point of view the manufacturer must supply the agriculturist with a low cost concentrate or spray- or dust-base in such form that merely by mixing with water or talc or other low cost materials readily available to the agriculturist at the point of use, he will have an easily prepared fungicidal spray or dust. For this purpose the compounds contemplated herein may be packaged as wettable powders containing a finely divided solid extender or filler. In general, the toxicants are preferably packaged as wettable powders containing the proportion of wetting agent previously described, such powders being adapted either for admixture with water to yield an aqueous spray or for use as a dust concentrate or for admixture with powdered solids to yield a more extended dust. Free-flowing, wettable powder concentrates preferably contain from about 20 to 100 parts by weight of an inert material per 100 parts by weight of combined fungicide and wetting agent. The aqueous sprays preferably contain so much of the toxicants that they are in the form of slurries or suspensions comprising undissolved (solid) toxicants as well as a minute amount of dissolved toxicant. When such a spray dries, there is not only the toxicant which is deposited from the spray water by the evaporation of the water but also the surplus toxicant which acts as a reserve, ready to dissolve and spread over the plant in case of dew or rain.

The fungicidal activity of the present materials is demonstrated by the following series of experiments. The tests used in the experiments are set forth below.

*Tomato foliage disease tests*

*Test organism.*—Early blight fungus *Alternaria solani* is the organism used in this test procedure. The organism is reared on potato dextrose agar in Petri dishes at a temperature of 20° C. Organisms used are transferred ten days prior to testing, scraped, and irradiated with ultraviolet for two minutes on the seventh day following transfer.

*Application of toxicant.*—One tomato plant variety, Bonny Best, of a standard age and height is sprayed on a revolving turntable. One hundred to one hundred and ten ml. of the formulated water mixture of the chemical is applied to each plant by use of a DeVilbiss spray gun with air pressure set at 40 pounds. Application of this volume of spray takes thirty seconds. An equal volume of a water solution containing acetone and emulsifier in the same concentrations as the fungicidal mixture but without the candidate fungicide, is also sprayed on six tomato plants which are held as check or control plants. As soon as the spray has dried, the plants are inoculated by again placing them on the turntable and spraying with a spore suspension of early blight containing 25,000 to 30,000 spores per ml. of water for thirty seconds at 20 pounds' pressure.

*Concentration of toxicant.*—The test compounds are formulated by a standard procedure of solution in acetone; addition of an emulsifier and dilution with water. Primary screening tests are run at 1000 p.p.m. and 100 p.p.m.

*Holding conditions.*—Following inoculation, the plants are incubated for twenty-four hours at 72° F. and 100 percent R.H. The plants are then removed from the incubation chamber and held for an additional twenty-four hours at room temperature.

*Record of results.*—The total number of lesions per 11 fields 15× magnification on 11 leaflets of the three top leaves of each plant are counted. A similar count is made on the control plants and the average number of lesions per plant is calculated. Control is based on a comparison of the number of lesions on the treated versus the untreated plants. Compounds are rated according to the following designations:

5=90–100% control
4=70–89% control
3=50–69% control
2=25–49% control
1=0–24% control

*Bean mildew tests*

*Test organism.*—Tendergreen beans are used as the host plant for the bean mildew, *Erysiphe polygoni*. A culture of this organism is maintained in the greenhouse. Forty-eight hours prior to testing uninfected plants with primary leaves fully expanded are inoculated by brushing their leaves lightly with plants taken from the stock culture.

*Application of toxicant.*—The bean plants infested with mildew, one pot for each concentration, are sprayed on a revolving turntable for thirty seconds at 40 pounds' pressure. Approximately 100 to 110 ml. of spray is delivered. An equal volume of a water solution containing acetone and emulsifier in the same concentrations as the fungicidal mixture but without the candidate mildewcide is also sprayed on six infected plants which are used as check or control plants.

*Concentration of toxicant.*—The test compounds are formulated by a standard procedure of solution in acetone; addition of an emulsifier and dilution with water. Primary screening tests are run at 1000 p.p.m. and 100 p.p.m. of the compound in the total solution.

*Holding conditions.*—After the spray has dried, the plants are removed to the greenhouse and held for a period of seven to ten days.

*Record of results.*—The degree of eradication on primary leaves is visually rated according to the following designations:

5=100% control, no spots per leaf
4=1 to 3 spots per leaf
3=4 to 10 spots per leaf
2=many, but distinctly separate spots
1=leaf overrun with mildew; equal to check plants The results of these tests are given in Table I below:

TABLE I

| Compound | Tomato Foliage | | Bean Mildew | |
|---|---|---|---|---|
| | 2,000 p.p.m. | 80 p.p.m. | 2,000 p.p.m. | 400 p.p.m. |
| 1 | | 4 | 4 | |
| 2 | 3 | 2 | 1 | |
| 3 | 5 | 4 | | 3 |
| 4 | 5 | 4 | | 1 |
| 5 | 3 | 2 | | 4 |
| 6 | 3 | 1 | 5 | |

As used herein, unless otherwise indicated, all parts and percentages are by weight.

The abbreviation "p.p.m." means parts per million.

This application is a continuation-in-part of application Serial Number 757,671, filed August 28, 1958, and now abandoned.

What is claimed is:

1. A compound represented by the formula:

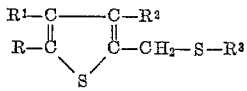

wherein R, when taken alone, is a member selected from the group consisting of a hydrogen atom and a —CH$_2$SZ radical; R$^1$, when taken alone, is a hydrogen atom; R and R$^1$, when taken together, form a divalent $$-CH=CH-CH=CH-$$

radical; R$^2$ is a member selected from the group consisting of a hydrogen atom and a —CH$_2$SZ radical; only one of said R and R$^2$ being a —CH$_2$SZ radical; R$^3$, when R is a hydrogen atom, is a

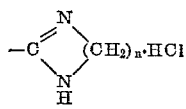

radical, wherein $n$ is an integer having a value of from 2 to 3, and, when R is a —CH$_2$SZ radical, is a Z radical; and Z is a member selected from the group consisting of

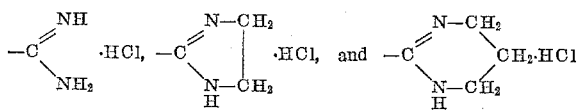

2. 2-(2-thienylmethylmercapto)imidazoline hydrochloride.

3. 2-(2-thienylmethylmercapto) - 3,4,5,6 - tetrahydropyrimidine hydrochloride.

4. 2,5 - bis(isothiuroniummethyl)thiophene dihydrochloride.

5. 2,5 - bis(2-imidazolinylmercaptomethyl) - thiophene dihydrochloride.

6. 2 - (2 - thianaphthenylmethylmercapto)imidazoline hydrochloride.

7. 2,3 - bis(isothiuroniummethyl)thianaphthene dihydrochloride.

8. 2,3 - bis(2 - imidazolinylmercaptomethyl) - thianaphthene dihydrochloride.

References Cited by the Examiner

UNITED STATES PATENTS

| 2,956,923 | 10/60 | Kent | 167—53 |
| 2,969,362 | 1/61 | Tweit | 260—251 |
| 2,994,637 | 8/61 | Blimber | 167—33 |
| 3,005,750 | 10/61 | Fluck et al. | 167—33 |
| 3,016,379 | 1/62 | Lloyd | 260—251 |

OTHER REFERENCES

Eisenhauer et al.: J. Amer. Chem. Soc., vol. 76 (1954), pages 1647–9.

Bonner: J. Amer. Chem. Soc., vol. 73 (1951), pages 464–5.

Kofod: Organic Syntheses, vol. 35 (1955), pages 66–8.

IRVING MARCUS, *Primary Examiner.*

NICHOLAS S. RIZZO, WALTER A. MODANCE, *Examiners.*